United States Patent
Namba et al.

(10) Patent No.: US 8,797,522 B2
(45) Date of Patent: Aug. 5, 2014

(54) LIGHT QUANTITY DETECTION METHOD AND DEVICE THEREFOR

(75) Inventors: Akihiro Namba, Hitachi (JP); Fujio Onishi, Yokohama (JP); Yasushi Terui, Tsuchiura (JP)

(73) Assignee: Hitachi High-Technologies Corporation, Tokyo (JP)

(*) Notice: Subject to any disclaimer, the term of this patent is extended or adjusted under 35 U.S.C. 154(b) by 0 days.

(21) Appl. No.: 13/701,399

(22) PCT Filed: Jul. 1, 2011

(86) PCT No.: PCT/JP2011/065225
§ 371 (c)(1),
(2), (4) Date: Jan. 4, 2013

(87) PCT Pub. No.: WO2012/017762
PCT Pub. Date: Feb. 9, 2012

(65) Prior Publication Data
US 2013/0114073 A1    May 9, 2013

(30) Foreign Application Priority Data
Aug. 4, 2010  (JP) ................. 2010-175311

(51) Int. Cl.
*G01J 1/44*    (2006.01)
*G01J 1/42*    (2006.01)

(52) U.S. Cl.
CPC ..... *G01J 1/44* (2013.01); *G01J 1/42* (2013.01)
USPC ...................................................... 356/226

(58) Field of Classification Search
CPC ........................................................ G01J 1/44
USPC ............... 250/363.1; 356/336, 226; 330/311
See application file for complete search history.

(56) References Cited

U.S. PATENT DOCUMENTS

| | | | |
|---|---|---|---|
| 5,715,049 A | 2/1998 | Ohsuka et al. | |
| 6,960,771 B1 | 11/2005 | Suyama et al. | |
| 2006/0097792 A1* | 5/2006 | Ryu et al. ................ | 330/311 |
| 2009/0251696 A1* | 10/2009 | McNeil-Watson et al. ... | 356/336 |

FOREIGN PATENT DOCUMENTS

| | | |
|---|---|---|
| JP | 5-264352 A | 10/1993 |
| JP | 8-023240 A | 1/1996 |
| JP | 9-178852 A | 7/1997 |
| JP | 9-196752 A | 7/1997 |

(Continued)

OTHER PUBLICATIONS

Corresponding International Search Report with English Translation dated Oct. 4, 2011 (eight (8) pages).

*Primary Examiner* — Tarifur Chowdhury
*Assistant Examiner* — Md Rahman
(74) *Attorney, Agent, or Firm* — Crowell & Moring LLP (57) ABSTRACT

To enable measurement over a wide dynamic range from weak light quantity to strong light quantity in a light quantity detection device for detecting the light quantity, a detection signal from a photon counting light detector is A/D converted. When the A/D converted detection signal has a preset threshold value or more, the detection signal is transmitted as it is to a number-of-photons calculation circuit in a subsequent stage, and when the detection signal has the threshold value or less, threshold value processing for transmitting a preset reference value to the subsequent stage is performed. In the number-of-photons calculation circuit, the number of photons or the light quantity incident on the photon counting light detector is acquired from the dimension of an acquired detection signal waveform until the light quantity measurement ends.

12 Claims, 12 Drawing Sheets

(56) References Cited

FOREIGN PATENT DOCUMENTS

| JP | 2000-275101 A | 10/2000 |
| JP | 2004-144734 A | 5/2004 |
| JP | 2006-300728 A | 11/2006 |
| JP | 2008-249694 A | 10/2008 |
| WO | WO 02/27283 A1 | 4/2002 |

* cited by examiner

LIGHT QUANTITY DETECTION METHOD AND DEVICE THEREFOR

TECHNICAL FIELD

The present invention relates to a method and a device of detecting a light quantity in a device that detects light emitted by a sample or a device that detects transmitted light and scattered light when light is irradiated to the sample, or a device that detects fluorescence generated from the sample when light is irradiated to the sample.

BACKGROUND ART

In an industrial material field, an environment field, a pharmaceutical field, and a bio field, light is irradiated to a sample and transmitted light or scattered light thereof or fluorescence generated from the sample by irradiation of light is detected and measured by a light quantity detection device, for analysis of an included component of the sample. In a semiconductor inspection equipment, light is irradiated to a semiconductor wafer and transmitted light or reflected light thereof is measured in order to inspect wirings formed on the semiconductor wafer or inspect foreign materials on the wafer. Further, for measuring aerosol that floats in the air, a laser is irradiated to the air to measure the scattered light. In the light quantity detection device, a detection range (dynamic range) of a light quantity needs to be widened in addition to detection of a weaker light quantity, for more detailed analysis.

The light quantity detecting method in the related art includes an analog measuring method of acquiring the intensity of an output signal of a light detector by light incident on a light detector and a photon count measuring method of counting an output pulse generated whenever photons are incident on the light detector.

First, the light quantity detection device by the analog measuring method will be described with reference to FIG. 2. The light quantity detecting device by the analog measuring method is configured to integrate an output signal 32 of an analog type light detector 31 into a preset time by an integrator 51, convert an output signal 52 of the integrator into a digital signal by an A/D converter 6, and arithmetically process the digital signal in a CPU 90.

Figure 2:
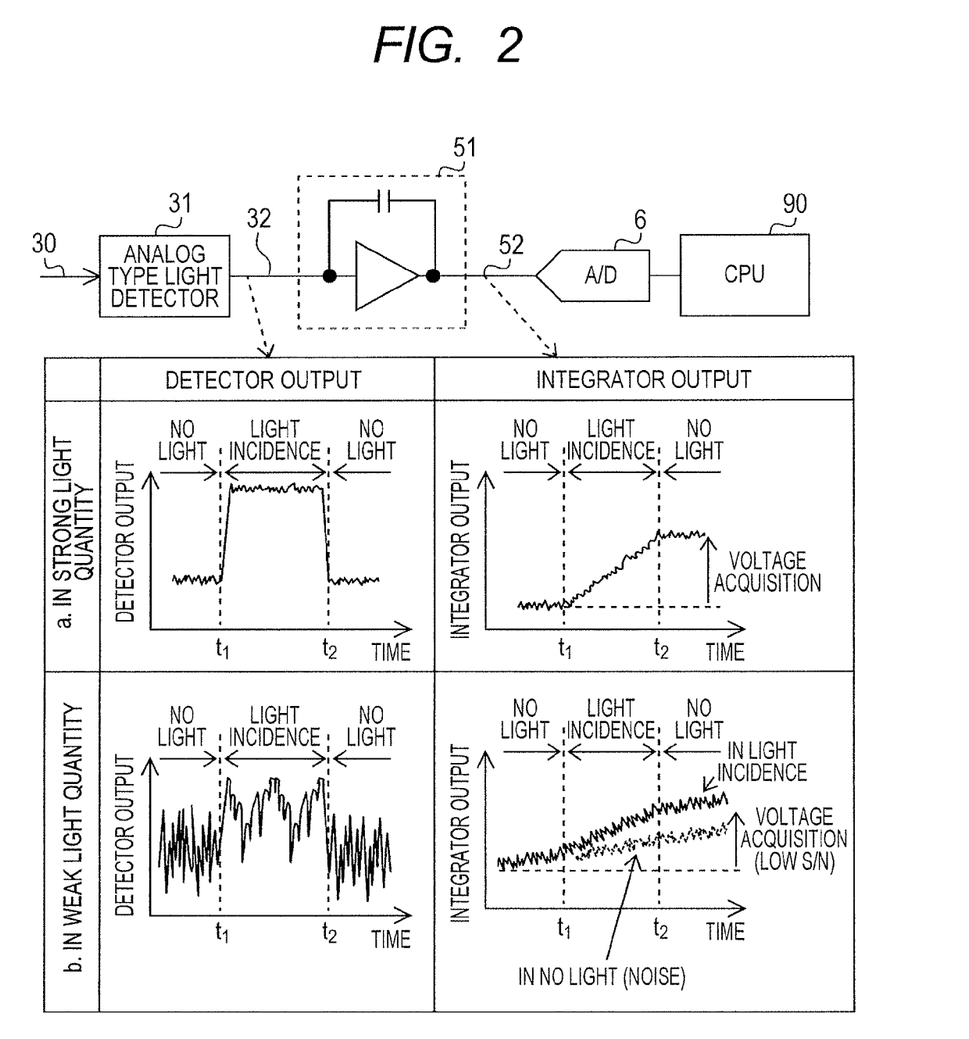
FIG. 2 is a diagram describing a schematic configuration and a feature of a light quantity detection circuit of an analog measurement method in the related art.

FIG. 2 is a diagram illustrating a waveform of a detector output 32 and a waveform of an integrator output 52. When a light quantity incident on the light detector 31 is strong (a. in the case of a strong light quantity), the output signal 32 of the light detector generates a strong detector output signal while light is incident. In the output signal 52 of the integrator of the signal, the integrator output is increased while light is incident and an integration result thereof is acquired by an A/D converter 6.

Meanwhile, Patent Literature 1 (Japanese Patent Application Laid-Open Publication No. Hei5(1993)-264352) disclosed that an integration time is increased in the case of a weak light quantity by a method of changing the integration time according to a light quantity, an output value of the integrator when light is incident can be significantly larger than an output value of the integrator when no light is incident, and measurement precision can be improved.

Further, as an additional method for solving a problem in which measurement precision deteriorates in the case of the weak light quantity, Patent Literature 2 (Japanese Patent Application Laid-Open Publication No. 2008-249694) discloses a method for preventing accumulation of noise signals less than a threshold value by substituting signals less than the threshold value into a reference value and decreasing a measurable light quantity lower limit value, in a time-of-flight mass spectrometer.

Next, the light quantity detection device by the photon count measuring method will be described with reference to FIG. 3. The light quantity detection device by the photon count measuring method is configured to compare the output signal 32 of the photon count type light detector 3 with the threshold value by using a comparator 61 to output 1 in the case of the threshold value or more and 0 in the case of the threshold value or less, measure the number of pulses of an output signal 62 of the comparator which an output is 1 by using a counter 63, and arithmetically process the measured number of pulses in the CPU 90.

Figure 3:
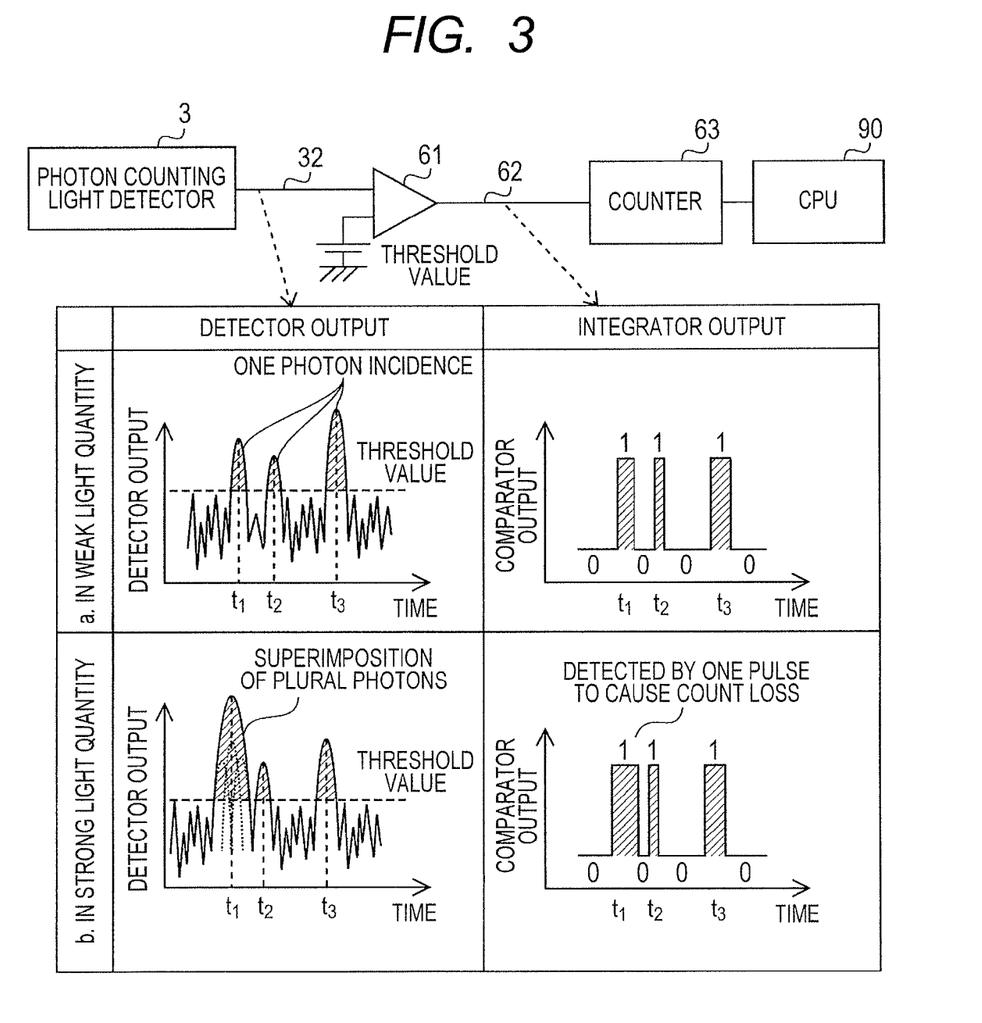
FIG. 3 is a diagram describing the schematic configuration and the feature of a light quantity detection circuit of a photon count measurement method in the related art.

FIG. 3 illustrates a diagram illustrating the waveform of the detector output 32 and a waveform of the comparator output 62. When light incident on the light detector 3 is weak (a. in the case of the weak light quantity), the output signal pulse generated whenever photons are incident on the light detector can be detected with high precision.

Further, Patent Literature 3 (Japanese Patent Application Laid-Open Publication No. Hei9(1997)-178852) discloses a method of detecting the light quantity by using the photon count measuring method in the case of the weak light quantity and detecting the light quantity by the analog measurement method in the case of the strong light quantity by in parallel using the analog measurement method and the photon count measuring method. As such, it is disclosed that the light quantity can be detected in a wide dynamic range by switching the measurement method according to the light quantity.

CITATION LIST

Patent Literatures

Patent Literature 1: Japanese Patent Application Laid-Open Publication No. Hei5(1993)-264352
Patent Literature 2: Japanese Patent Application Laid-Open Publication No. 2008-249694
Patent Literature 3: Japanese Patent Application Laid-Open Publication No. Hei9(1997)-178852

SUMMARY OF INVENTION

Technical Problem

In the light quantity detection device by the analog measurement method in the related art, when the light quantity incident on the light detector is decreased (b. in the case of the weak light quantity), an S/N ratio of the output signal of the light detector when light is incident deteriorates. As a result, since the noise signal is also integrated together, a difference between the case in which light is not incident at all during the integration time and the case in which weak light is incident in output signal of the integrator is decreased and measurement precision deteriorates.

Meanwhile, in the method of changing the integration time according to the light quantity disclosed in Patent Literature 1 (Japanese Patent Application Laid-Open Publication No. Hei5(1993)-264352) or the method for preventing accumulation of the noise signals less than the threshold value and decreasing the measurable light quantity lowerlimit value disclosed in Patent Literature 2 (Japanese Patent Application Laid-Open Publication No. 2008-249694), improvement of measurement precision in the case of a weaker light quantity is limited due to the feature of the analog measurement method in which the S/N ratio of the output signal of the detector deteriorates in the case of the weak light quantity, in both methods.

Further, when the light quantity is detected by the photon count measuring method, photons are continuously incident at an interval narrower than the pulse width of the output signal of the light detector generated when one photon is incident in the case where the light quantity is increased (b of FIG. 3. in the case of the strong light quantity), and as a result, the output signal of the light detector becomes a superimposition signal of pulses by the photons. A waveform in the case of the strong light quantity in b of FIG. 3 illustrates an example in which three photons are incident in a short time before and after a time t1. As such, the output signal of the light detector becomes one large pulse in which three photons superimpose on each other and the output signal of the comparator also becomes one pulse. As a result, since a count loss of photons occurs, the accurate number of photons cannot be measured.

In addition, in the method disclosed in Patent Literature 3, two types of light detection systems of the analog measurement method and the photon count measuring method need to be prepared, and as a result, the device becomes bigger. Further, the analog measurement method and the photon count measuring method are different from each other in linearity of the output signal to the incident light quantity.

A request for the light quantity detection device is that the light quantity can be detected in the wide dynamic range from the weak light quantity to the strong light quantity.

Therefore, the present invention provides a photon counting light quantity detection method which solves the problem in which the measurement precision deteriorates due to the count loss of photons when the light quantity is increased in the photon count measuring method suitable for detection of the weak light quantity and has a wide dynamic range.

Solution to Problem

In order to achieve the object, a light quantity detection device of the present invention includes: a light detector which detects light; an amplifier which amplifies a detection signal from the light detection means; an A/D convertor which A/D converts the detection signal amplified by the amplifier; a threshold value processing circuit unit which carries out threshold processing to the detections signal A/D converted by the A/D convertor by using a threshold value; and a number-of-photons calculation circuit unit which calculates the intensity of light or the number of photons incident on the light detector from the detection signal which is threshold processed by the threshold value processing circuit unit, wherein the number-of-photons calculation circuit unit calculates the intensity of light or the number of photons incident on the light detector based on a dimension of a signal waveform of the detection signal threshold processed by the threshold value processing circuit unit.

In order to achieve the object, a light quantity detection method of the present invention includes: detecting light by a light detector; amplifying a detection signal from the light detector detecting the light; A/D converting the amplified detection signal; threshold value-processing the A/D converted detection signal by using a preset threshold value; and calculating the intensity of light or the number of photons incident on the light detection means from the detection signal which is threshold value-processed, wherein in the calculating of the number of photons, the intensity of light or the number of photons incident on the light detector is calculated based on a dimension of a signal waveform of the detection signal threshold processed.

Advantageous Effects Of Invention

According to the present invention, it is possible to provide a light quantity detection device capable of detecting light in the wide dynamic range from the weak light quantity to the strong light quantity.

DESCRIPTION OF EMBODIMENTS

Hereinafter, embodiments of the present invention will be described in detail with reference to the accompanying drawings. Further, in all the drawings for describing the embodiments, the same reference numerals principally refer to the same components and a repeated description thereof will be omitted.

First Embodiment

Figure 1:
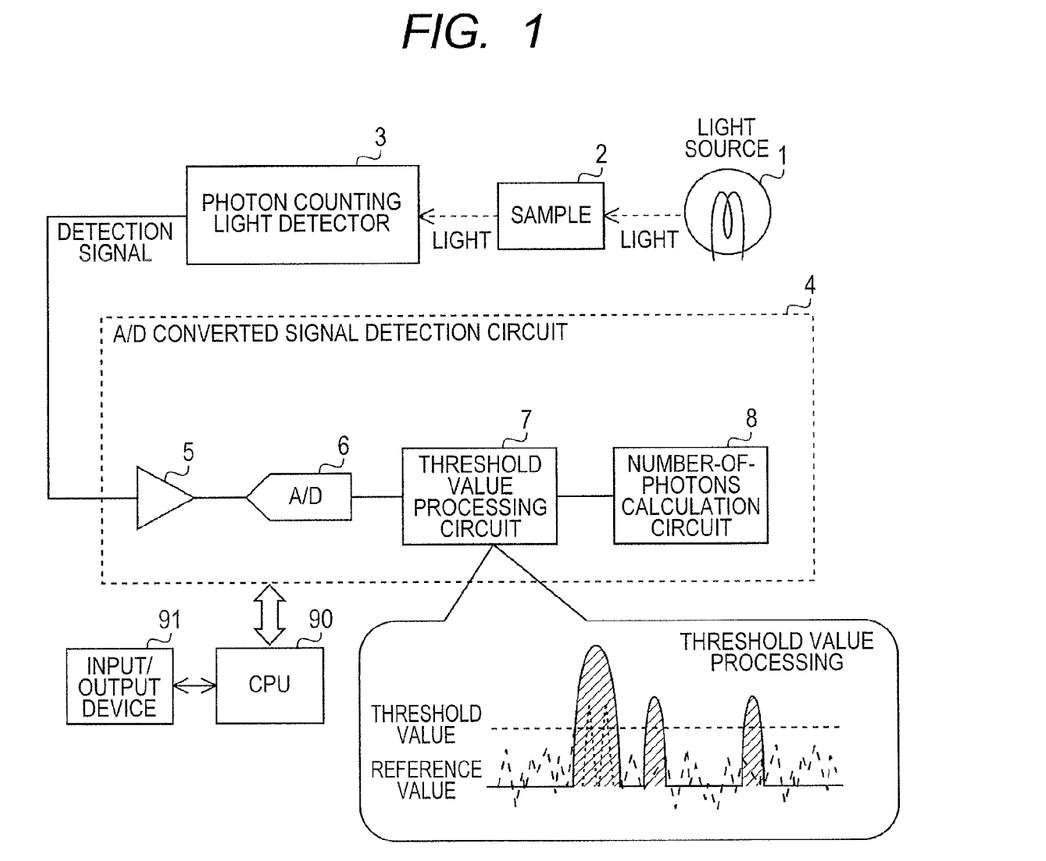
FIG. 1 is a block diagram illustrating a schematic configuration of a light quantity detection device according to a first embodiment of the present invention.

FIG. 1 is a diagram illustrating a configuration of a light quantity detection device according to a first embodiment of the present invention.

The light quantity detection device according to the present invention is configured to include a light source 1 for irradiating light to a sample 2 mounted thereon, a photon counting type light detector 3 for detecting transmitted light or reflected light of the sample, or fluorescence from the sample generated by irradiation, an A/D converted signal detecting circuit 4 for converting an output signal from the photon counting type light detector 3 into a digital signal and processing the digital signal, a CPU 90 for controlling the light quantity detection device such as the A/D converted signal detecting circuit 4, and the like, and an input/output device 91 such as a keyboard or a mouse, or a display device.

The A/D converted signal detecting circuit 4 includes an amplifier 5 for amplifying a detection signal, an A/D converter 6 for converting the amplified detection signal into the digital signal, a threshold value processing circuit 7 for performing processing of substituting the A/D converted detection signal into a reference value when the A/D converted detection signal is equal to or less than a threshold value, and a number-of-photons calculation circuit 8 for calculating the number of photons or a light quantity incident on the light detector from a signal waveform dimension of the threshold value processed detection signal.

Figure 4:
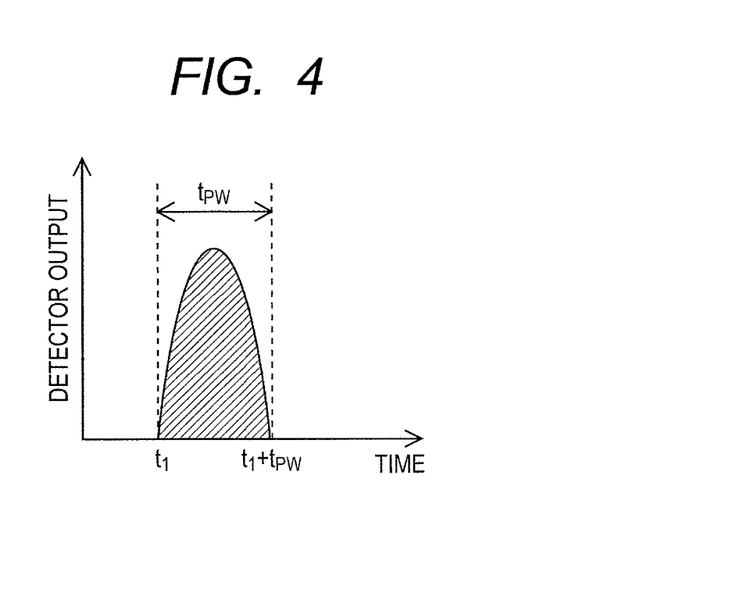
FIG. 4 is a waveform diagram describing a waveform of an output signal of a photon count detector when one photon is incident.

The photon counting light detector 3 amplifies electrons generated by the photons incident on the light detector and outputs the detection signal as a current pulse. FIG. 4 illustrates a simulated detector output waveform of a pulse width tPW generated from the photon counting type light detector 3 as the detection signal when one photon is incident on the photon counting light detector 3 at a time t1. When a plurality of photons is incident, the detection signal becomes a waveform in which output pulses by the respective photons superimpose on each other.

Figure 5:
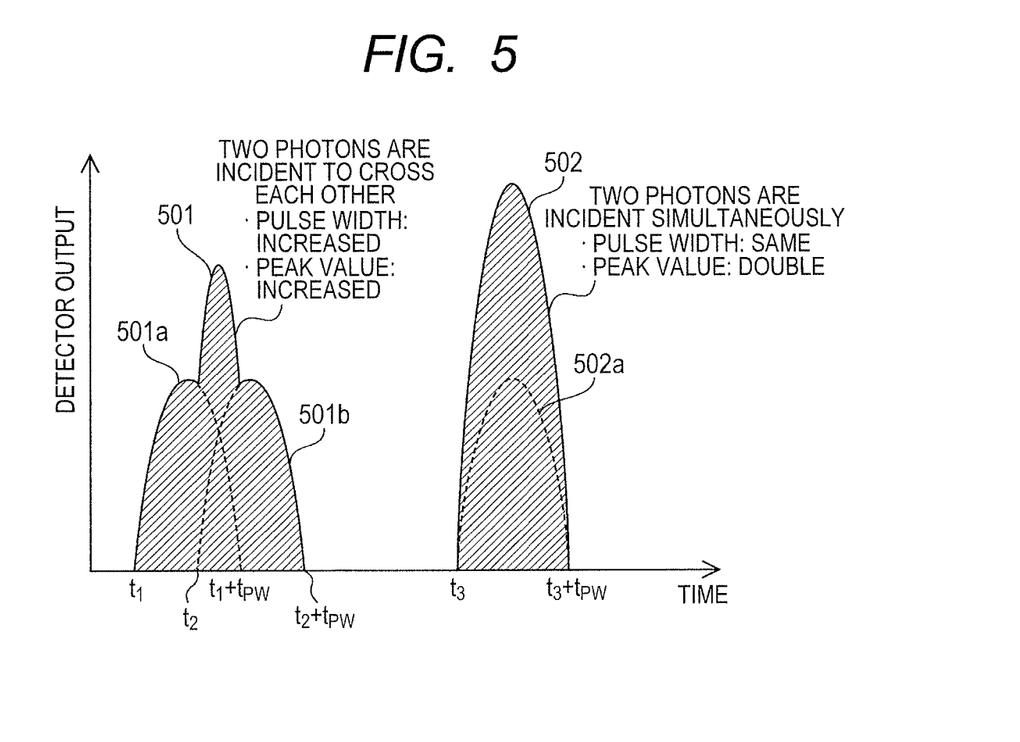
FIG. 5 is a waveform diagram describing the waveform of the output signal of the photon count detector when two photons are incident.

An example of the superimposed waveform when the plurality of photons is incident will be described with reference to FIG. 5. Herein, the pulse width of the output signal pulse by one photon is set as tPW. First, a waveform 501 represents a detector output waveform when two photons are incident at intervals t1 and t2 which are narrower than the pulse width tPW, and the pulse width is increased as compared with pulse waveforms 501a and 501b when one photon is incident. A peak value depends on a time interval at which two photons are incident. In the example of the waveform 501 illustrated in the FIG. 5, the peak value is increased. A waveform 502 represents a detector output waveform when two photons are incident at the same time t3, and the pulse width tPW is the same of the width of a waveform 502a when one photon is incident, but a wave height value thereof is twice more than the waveform 502a when one photon is incident.

Herein, when focusing on area of an output waveform in the case where the plurality of photons superimpose on each other, the area of the waveform increases in proportion to the number of photons which are incident. That is, by evaluating the area of the detection signal waveform, even when the plurality of pulses superimpose on each other due to the increase in light quantity, the number of photons may be accurately detected. In the example illustrated in FIG. 5, since two photons are incident to detect signals of two pulses in both the waveforms 501 and 502, the waveforms 501 and 502 are the same with each other in area.

Figure 6A:
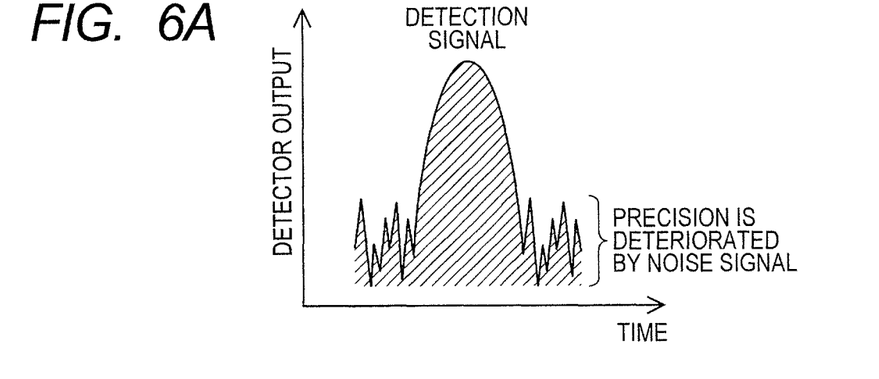
FIG. 6A is a waveform diagram describing deterioration in precision by a noise signal.
Figure 6B:
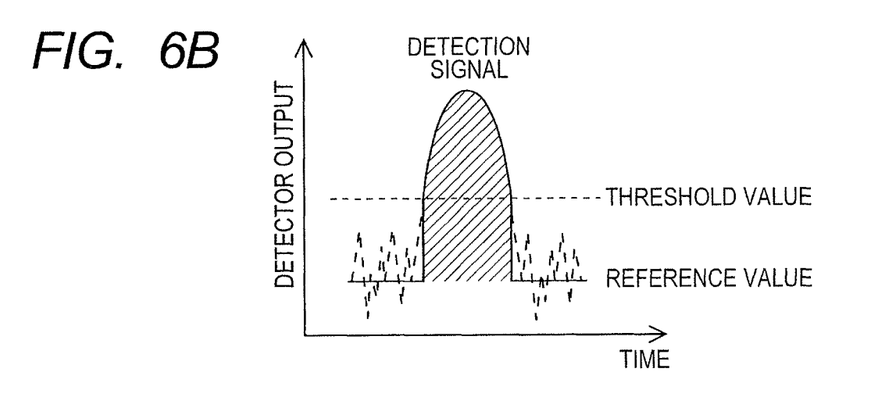
FIG. 6B is a waveform diagram describing threshold value-processing of the present invention.

However, precision deteriorates by a noise signal included in the detection signal as illustrated in FIG. 6A just by evaluating the area of the detection signal waveform. Therefore, as illustrated in FIG. 6B, by substituting a noise signal which is equal to or less than the threshold value into a reference value, an influence of the noise is excluded. As a result, a dimension in the case of a weak light quantity in which the number of pulses is small may be accurately evaluated and precision may be improved.

Figure 7:
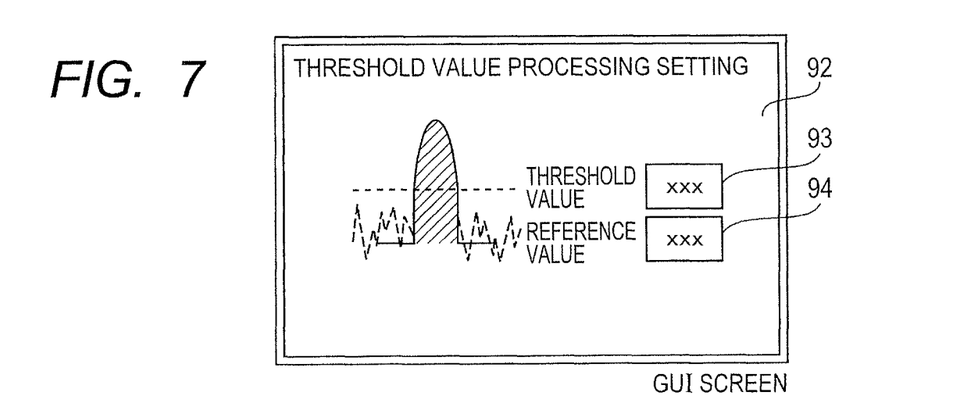
FIG. 7 is a front view a GUI screen for inputting a setting value of threshold value-processing in the first embodiment of the present invention.

The threshold value for threshold value-processing by the threshold value processing circuit 7 and the reference value are set on a GUI (graphical user interface) screen 92 for setting the threshold value-processing as illustrated in FIG. 7. A threshold value input box 93 for inputting the threshold value and a reference value input box 84 are disposed on the GUI screen 92.

Figure 8:
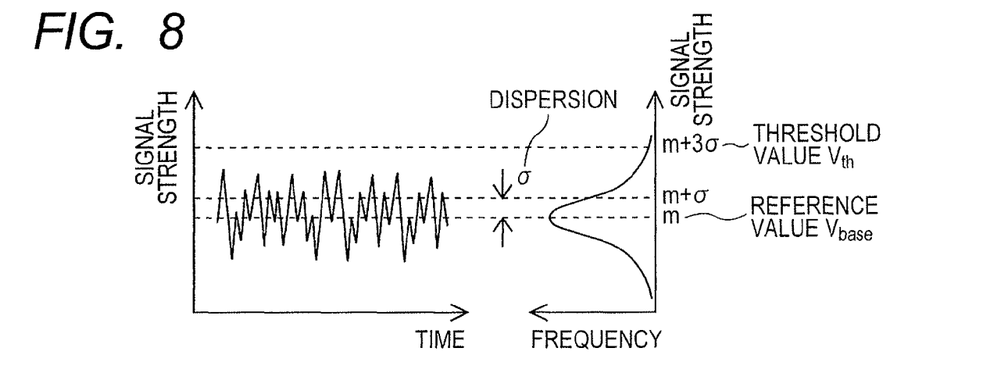
FIG. 8 is a graph illustrating a temporal change of the intensity of the detection signal describing a method of determining a threshold value and a reference value and a graph illustrating an intensity distribution of the detection signal, in the first embodiment of the present invention.
Figure 9:
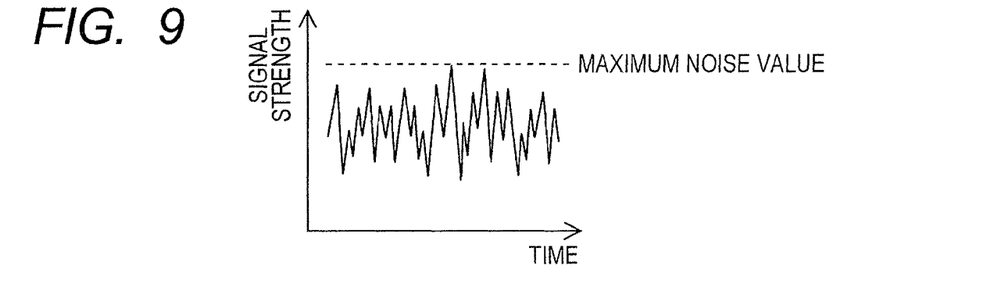
FIG. 9 is a graph illustrating a temporal change of the intensity of the noise signal describing a method of determining the threshold value from a maximum value of noise in the first embodiment of the present invention.
Figure 10:
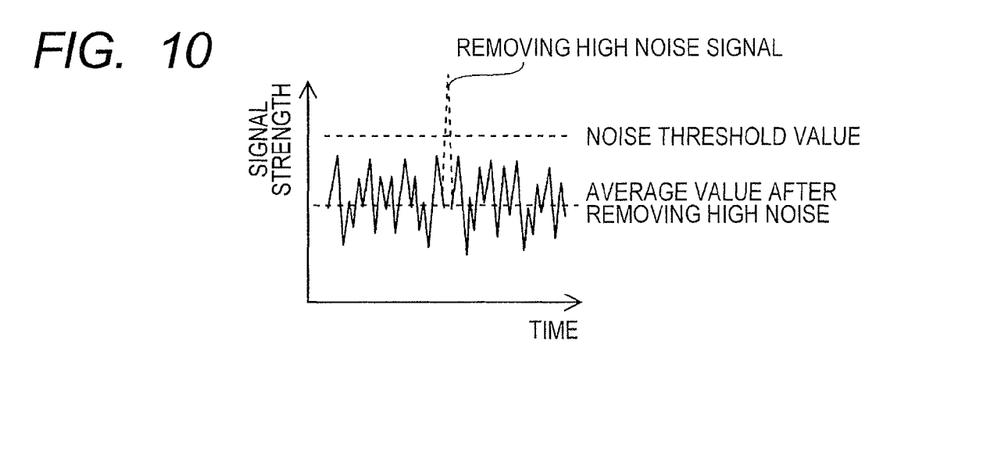
FIG. 10 is a graph illustrating a temporal change of the intensity of the noise signal describing a method of determining the reference value by removing a high-noise signal in the first embodiment of the present invention.

Alternatively, the threshold value and the reference value may also be determined from a measurement result. Since the noise signal removed by the threshold processing is a signal output from the detector when no light is incident in the detector, the threshold value and the reference value are determined in advance from the noise signal output from the detector when no light incident in it. An example thereof is illustrated in FIG. 8. First, the noise signal in the case of no incident light is acquired, and a mean value m thereof and dispersion σ are calculated. A threshold value Vth for the threshold processing is determined as Vth=m+3σ from the mean value m and the dispersion σ. Further, a reference value Vbase is determined as Vbase=m from the mean value m of the noise signal. Of course, the threshold value and the reference value may be determined by a method other than the above based on the mean value and the dispersion. Alternatively, as illustrated in FIG. 9, the threshold value and the reference value may be determined from a maximum noise value during the acquisition period of the noise signal in the case of no incident light. In addition, the calculation of the reference value may be determined as the means value, and the like from a signal from which a high-noise signal which is more than a noise threshold value is removed in order to suppress an error in calculating the reference value by noise having high intensity, which is unexpectedly mixed during the acquisition period of the noise signal in the case of no incident light, as illustrated in FIG. 10. Herein, the noise threshold value may be the threshold value Vth determined above and may be an additionally designated value.

Figure 11:
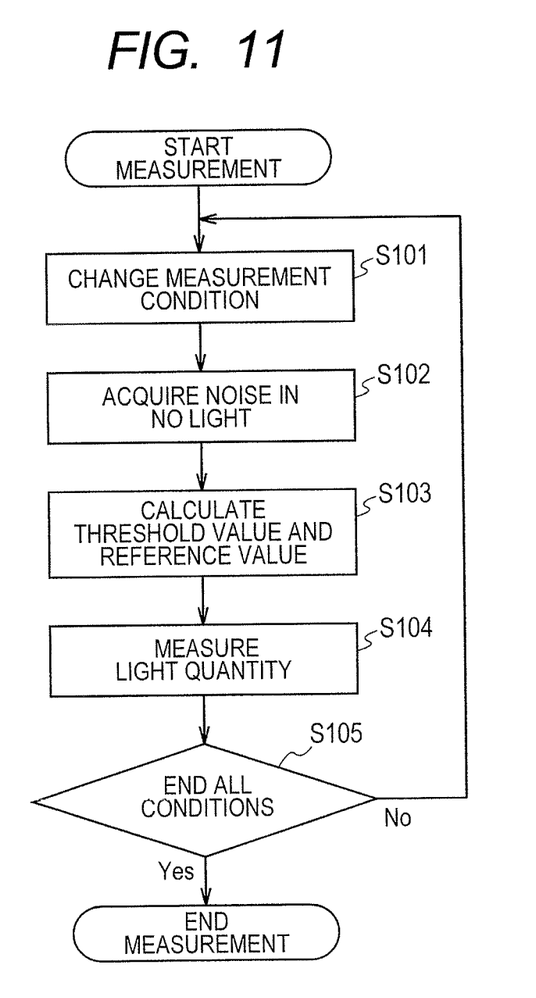
FIG. 11 is a flowchart illustrating a sequence of determining the threshold value and the reference value in the first embodiment of the present invention.

In the light quantity detection device that measures the light quantity while changing a measurement condition, the threshold value and the reference value may be determined according to a sequence illustrated in a flowchart of FIG. 11. First, the measurement condition is changed (S101), and thereafter, the noise in the case of no incident light is acquired (S102), and the threshold value Vth and the reference value Vbase are calculated (S103). Thereafter, the light quantity of the sample is measured (S104), and the threshold processing is performed with respect to the measurement signal by using the threshold value Vth and the reference value Vbase which are calculated in step S103. Steps from S101 to S104 are repeated until the measurement is completed under all measurement conditions (S105).

The number-of-photons calculation circuit 8 calculates the number of photons or the light quantity which is incident on the light detector from the dimension of the detection signal which is threshold processed by the threshold value processing circuit 7. First, the detection signal waveform from the photon counting light detector 3 is stored when one photon is incident, in advance, which is equivalent to FIG. 4. And then, the threshold value set by the threshold value processing circuit 7 is applied thereto to acquire and store a waveform area for one photon which is equal to or higher than a threshold value level. When the number of photons or the light quantity which is incident on the light detector is calculated from the detection signal area, the detected number of photons is acquired based on the stored waveform area for one photon.

Meanwhile, in the embodiment, the waveform dimension need not particularly be converted into the number of photons or the light quantity, and the waveform dimension which is correlated therewith may be used as a light quantity detection result.

The irradiation light to the sample 2 or the incident light on the light detector may be visible light, infrared light, ultraviolet light, or a radioactive ray, and it does not matter the type of light. Further, the state of the sample 2 may be gas, liquid, solid, and the like.

In applying the light quantity detection method of the present invention to a photometer, the transmitted light, the reflected light, and the fluorescence which are caused by the irradiation of light to the sample are detected in a wide dynamic range. As a result, a component included in the sample may be more accurately analyzed by detecting the light quantity while changing the wavelength. Further, the sample may be a semiconductor wafer, and the like, and in this case, this invention is applied to a semiconductor inspection device for the defect inspection of the wirings formed on the wafer or inspection of foreign materials on the wafer to detect more minute wirings or minute foreign materials, and the like. Further, the present invention is also applicable to a light quantity detection device having no light source that detects light emitted from the sample, and the light quantity detection device having the wide dynamic range is implemented.

The light quantity detection device capable of detecting the light quantity in the wide dynamic range may be implemented by the light quantity detection method of the present invention. The effect thereof is not only broadening a dynamic range but also shorting a measuring time in a small quantity of light by dispensing with a long-time integration processing for improving an S/N ratio.

Second Embodiment

Figure 12:
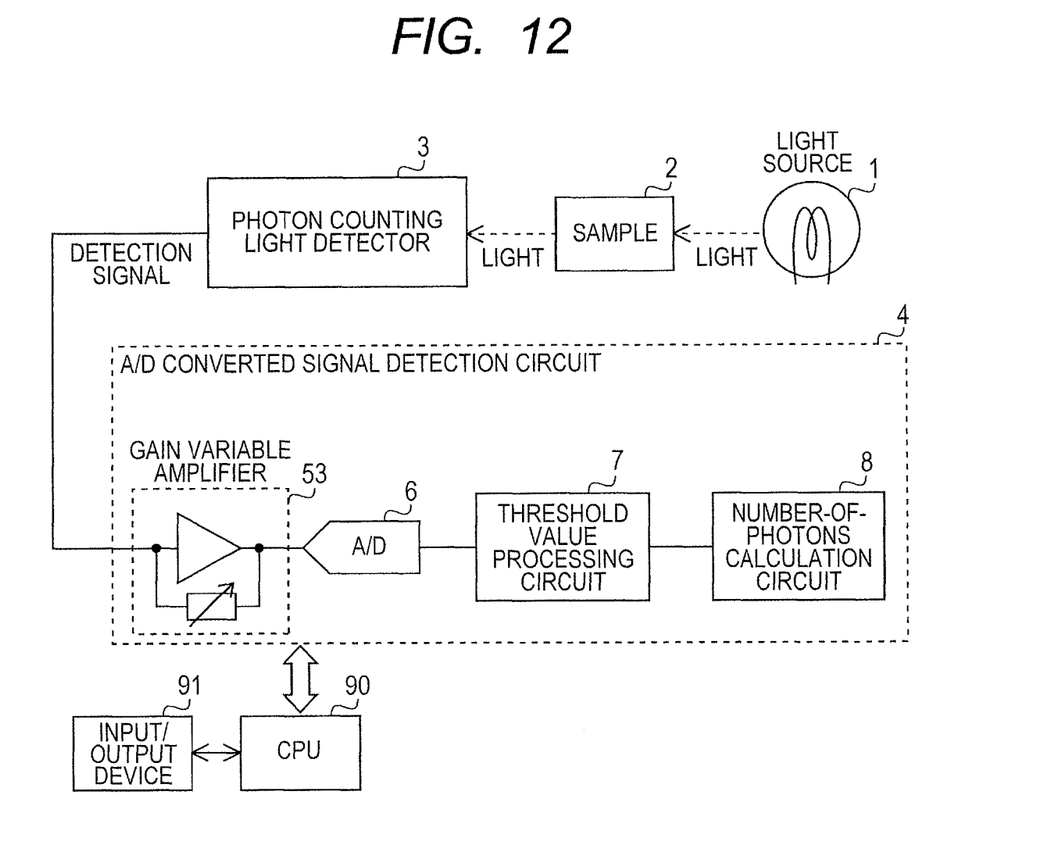
FIG. 12 is a block diagram illustrating a schematic configuration of a light quantity detection device according to a second embodiment of the present invention.

Next, a light quantity detection device according to a second embodiment of the present invention will be described with reference to FIG. 12. A configuration of the light quantity detection device according to the second embodiment is primarily the same as that of the first embodiment illustrated in FIG. 1, but is different from that of the first embodiment in that the amplifier 5 of FIG. 1 is substituted by a gain variable amplifier 53. A feature of the embodiment is that the detection signal of the photon counting light detector 3 is amplified by the gain variable amplifier 53. As a result, the output signal of the light detector may be efficiently A/D converted regardless of the intensity of the output signal of the light detector by adjusting the detection signal level input into the A/D converter 6, and the wide dynamic light quantity detection device may be implemented by using the gain variable amplifier 53 together with the threshold value processing circuit and the number-of-photons calculation circuit.

In general, a detection sensitivity of the light detector significantly depends on a wavelength of incident light. For example, when a photomultiplier tube is used as the light detector, approximately three digits may be changed within a visible light wavelength. As a result, when such type of light detector is used, a gain of the amplifier needs to be adjusted for each wavelength in order to detect the light quantity in the wide dynamic range. Further, even in measuring a sample to be measured, which has significantly different concentration, the gain of the amplifier needs to be adjusted.

The gain adjustment of the gain variable amplifier 53 may be performed according to a sequence described below. First, detecting light with the light detector with the preset gain, and it is judged whether the intensity of the A/D converted detection signal is within a desired range. When the intensity of the A/D converted detection signal is within the corresponding range, the measurement is just continued. And when the intensity of the A/D converted detection signal is out of the range, the gain is adjusted so that the signal intensity is within the desired range.

When the gain of the gain variable amplifier 53 is changed, the threshold value and the reference value for the threshold value-processing are changed in accordance therewith. For example, when the gain is set to double, the threshold value and the reference value are also set to twice as much. Alternatively, the threshold value and the reference value may be measured again by the method disclosed in the first embodiment when the gain is changed.

Further, when the gain of the gain variable amplifier 53 is changed, the intensity of the A/D converted detection signal is changed depending on the gain and the area of the detected waveform is also changed. As a result, the number-of-photons calculation circuit calculates the waveform area by correcting the change in intensity of the detection signal by the change in gain. Alternatively, the A/D converted detection signal is corrected according to the gain of the amplifier and thereafter, may be threshold processed.

Figure 13:
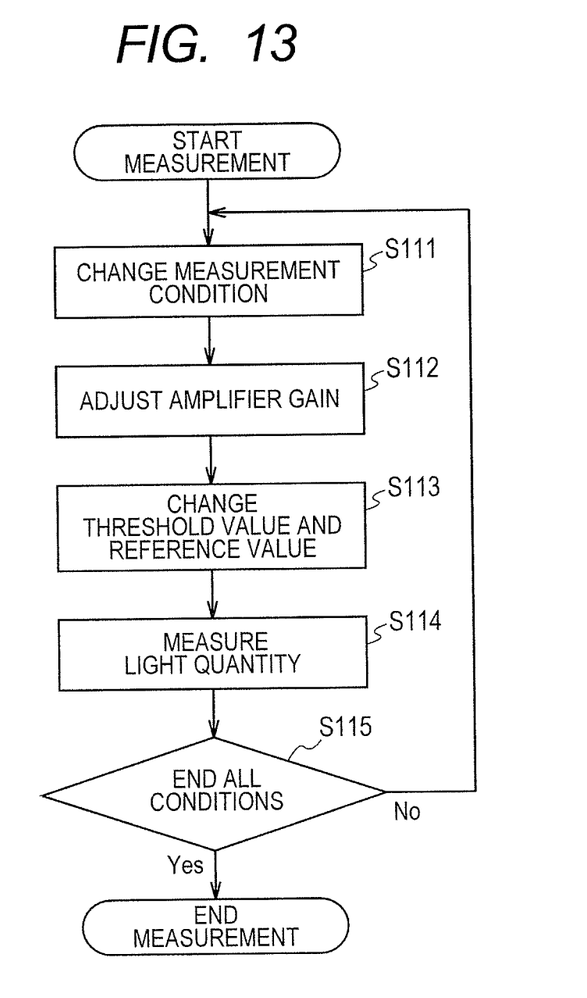
FIG. 13 is a flowchart illustrating a sequence of adjusting a gain of an amplifier in the second embodiment of the present invention.

In the light quantity detection device that measures the light quantity while changing the measurement condition, the measurement condition is changed (S111) and thereafter, the gain of the amplifier is adjusted (S112), as illustrated in a flowchart of FIG. 13. When the gain is changed, the threshold value and the reference value are also changed (S113).

In S113, the threshold value and the reference value may be calculated and changed according to the changed gain, and the threshold value and the reference value may be determined by using actual measurement data after adjusting the gain. Thereafter, the light quantity is measured in step S114, and steps from S111 to S114 are repeated until measurement is completed under all measurement conditions (S115).

Figure 14:
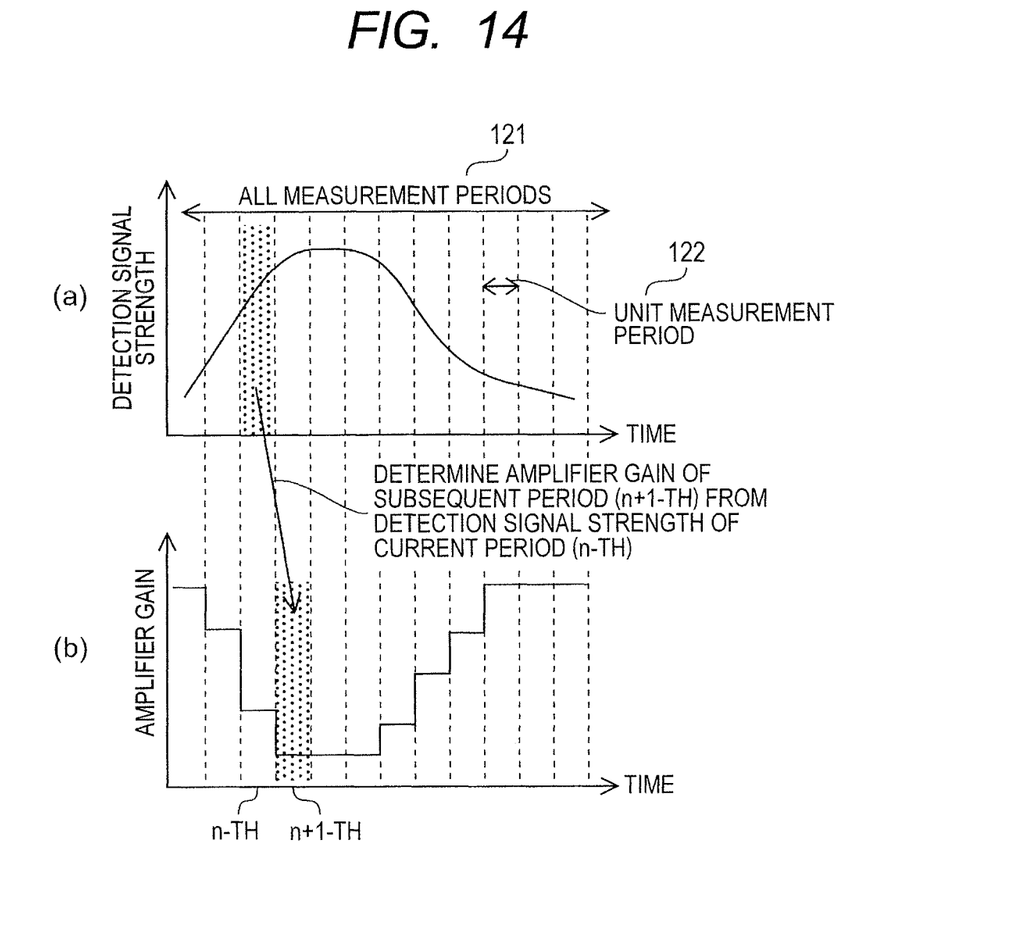
FIG. 14 is (a) a signal waveform diagram and (b) a diagram illustrating a temporal change of an amplified gain for describing a method of changing the gain of the amplifier according to the intensity of the signal in the second embodiment of the present invention.

When the intensity of the detection signal is changed at a speed lower than a sampling speed of the A/D converter 6, the gain of the gain variable amplifier 53 may be changed depending on the change in signal intensity. A sequence thereof will be described in FIG. 14. First, as illustrated in (a), in the waveform of the intensity of the detection signal, a total measurement period 121 is divided into a plurality of unit measurement periods 122. The gain of the amplifier is set in every unit measurement period as illustrated in (b) and the gain of the amplifier during a subsequent n+1-th unit period is determined based on a detection signal intensity during an n-th unit period. For example, when the detection signal intensity during the n-th unit period is larger than a desired signal range, the gain during the subsequent n+1-th unit period is decreased, while when the detection signal is smaller than the desired signal range, a gain during a subsequent period is increased. As described above, the gain of the amplifier is changed depending on the detection signal intensity and measured. When the gain is changed, the threshold value and the reference value for the threshold value-processing are changed depending on the gain of the amplifier. Further, the intensity of the A/D converted detection signal is corrected according to the gain.

When the intensity of the detection signal is changed rapidly by the time, changing the gain depending on the signal intensity is delayed. In measuring the detection signal whose intensity changes at high speed, the detection signal is measured while the gain is fixed after the gain of the amplifier is appropriately adjusted in advance. As a result, for example, a measurement of a transient response characteristic which terminates a response in a short time is enabled to carry out.

Third Embodiment

Figure 15:
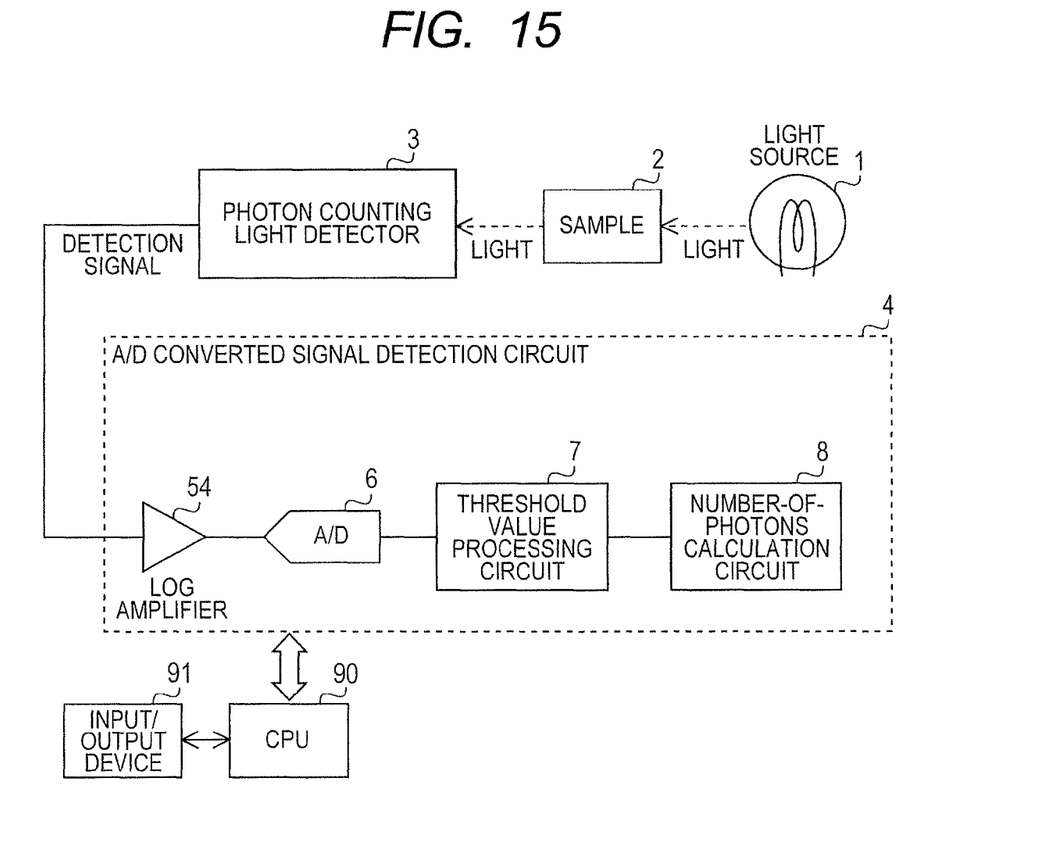
FIG. 15 is a block diagram illustrating a schematic configuration of a light quantity detection device according to a third embodiment of the present invention.

Next, a light quantity detection device according to a third embodiment of the present invention will be described with reference to FIG. 15. A feature of the light quantity detection device according to the third embodiment is that the detection signal of the photon counting type light detector 3 is amplified by a log amplifier 54.

When input voltage, output voltage, and a gain of the log amplifier are expressed by Vi, Vo, and K, respectively, the output voltage of the log amplifier may be represented by the following equation.

$$Vo = K \cdot \log Vi \quad \text{(Equation 1)}$$

By using the log amplifier, the wide dynamic range signal of the detection signal of the light detector may have a narrowed dynamic range after an output from the log amplifier. And for example, even when the detection signal of the light detector has a three-digit dynamic range, the amplified signal may be narrowed to a triple dynamic range. As such, the detection signal having the wide dynamic range may also be efficiently converted by the A/D converter 6, and the wide dynamic light quantity detection device may be implemented by using the A/D converter 6 together with the threshold value processing circuit and the number-of-photons calculation circuit.

Fourth Embodiment

Figure 16:
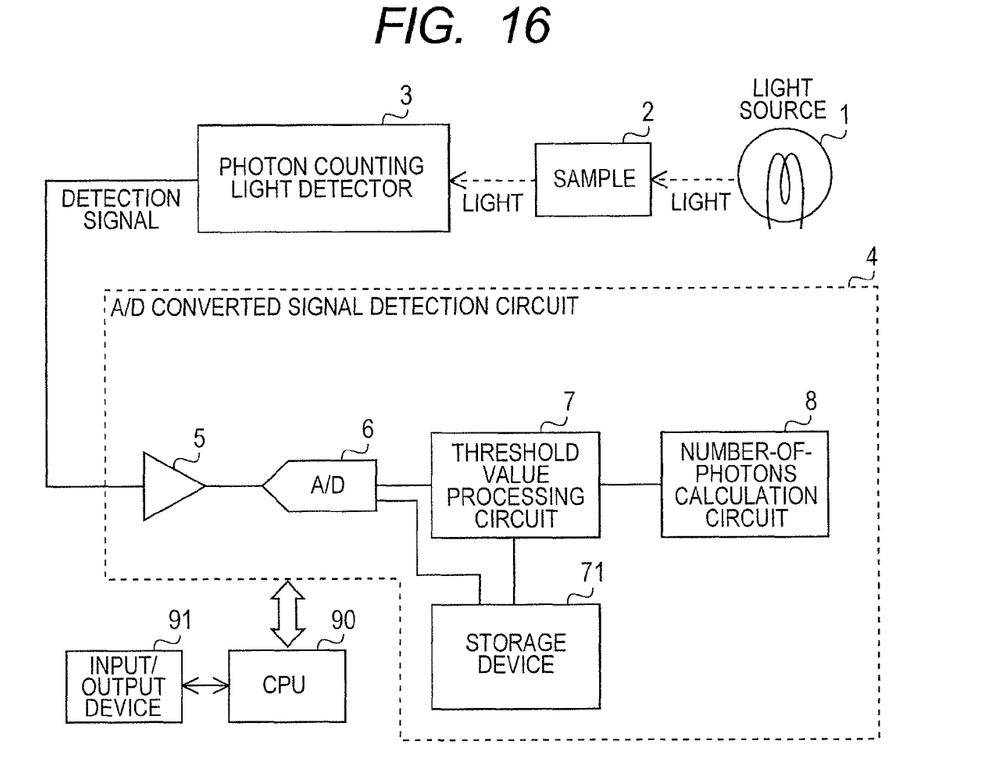
FIG. 16 is a block diagram illustrating a schematic configuration of a light quantity detection device according to a fourth embodiment of the present invention.

Next, a light quantity detection device according to a fourth embodiment of the present invention will be described with reference to FIG. 16. A feature of the light quantity detection device according to the fourth embodiment is to include a storage device 71 for storing the detection signal digitally converted by the A/D converter 6.

The detection signal of the photon counting type light detector 3 is amplified by the amplifier 5 and A/D converted by the A/D converter 6. The A/D converted detection signal is stored in the storage device 71. After measurement is terminated, the signal stored in the storage device 71 is taken out to be threshold processed by the threshold value processing circuit 7, and the number of photons or the light quantity incident on the light detector is calculated by the number-of-photons calculation circuit 8.

Figure 17:
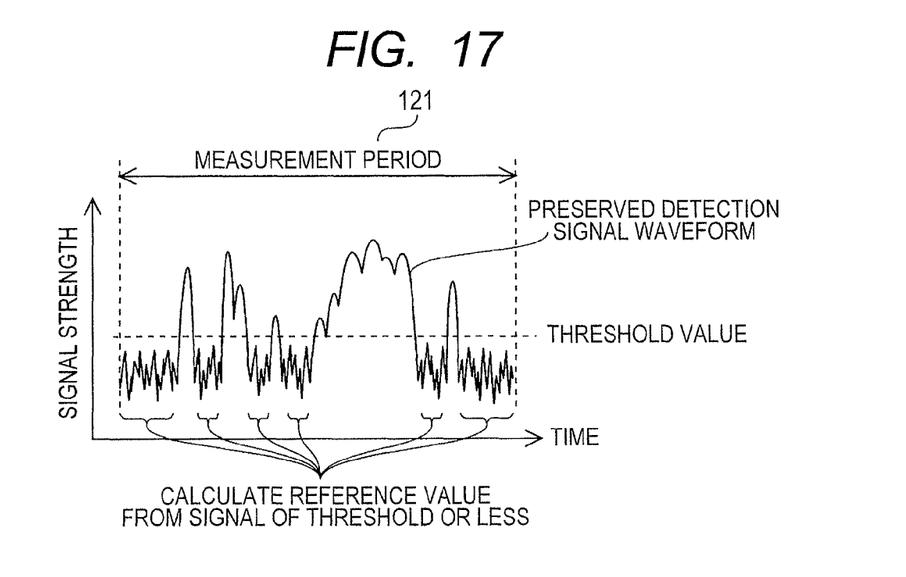
FIG. 17 is a graph illustrating a temporal change of the intensity of a detection signal for describing a method of determining a reference value from a stored detection signal in the fourth embodiment of the present invention.

The reference value in the threshold processing may be determined by the method described in the first embodiment and determined by a method illustrated in FIG. 17 by using the stored detection signal. The drawing illustrates one example of the waveform of the detection signal stored during the measurement period 121. In order to determine the reference value, only a signal which is equal to or less than the threshold value is taken out from the stored signal and the reference value is determined from a mean value of the signal, and the like. Thereafter, threshold value-processing of substituting the signal which is equal to or less than the threshold value into the reference value is performed with respect to the waveform of the stored detection signal, and the number of photons or the light quantity is calculated by the number-of-photons calculation circuit 8. Further, the threshold value may also be calculated from the waveform of the stored detection signal.

As described above, the invention performed by the present inventors has been described in detail based on the embodiments, but it is apparent that the present invention is not limited to the embodiments, but various changes can be made without departing from the spirit thereof.

Industrial Applicability

The present invention can be used in a method and a device of detecting a light quantity in a device that detects light emitted by a sample or a device that detects transmitted light and scattered light when light is irradiated to the sample, or a device that detect fluorescence generated from the sample when light is irradiated to the sample, in an environment field, a pharmaceutical field, and a bio field.

In particular, the present invention may be used in a semiconductor inspection device that irradiates light to the semiconductor wafer and measures transmitted light or reflected light thereof to inspect the wirings formed on the semiconductor wafer or inspect the foreign materials on the wafer or a device for measuring aerosol that floats in the air by irradiating the laser to the air and measuring scattered light thereof.

Reference Sign List

1 Light source
2 Sample
3 Photon counting light detector
31 Analog type light detector
32 Output signal of detector
4 A/D converted signal detection circuit
5 Amplifier
51 Integrator
52 Integrator output signal
53 Gain variable amplifier
54 Log amplifier
6 A/D converter
61 Comparator
62 Comparator output signal
63 counter
7 Threshold value processing circuit
71 Storage device
8 Number-of-photons calculation circuit
90 CPU
91 Input/output device
92 GUI screen for setting threshold value-processing
93 Threshold value input box
94 Reference value input box

The invention claimed is:

1. A light quantity detection device, comprising:
a light detector which detects light;
an amplifier which amplifies a detection signal from the light detector;
an A/D converter which A/D converts the detection signal amplified by the amplifier;
a threshold value processing circuit unit which carries out threshold processing to the detection signal A/D converted by the A/D converter by substituting a signal at a level which is equal to or less than a threshold value among the A/D converted detection signals into a preset reference value; and a number-of-photons calculation circuit unit which calculates the intensity of light or the number of photons incident on the light detector from the detection signal which is threshold processed by the threshold value processing circuit unit,
wherein the number-of-photons calculation circuit unit calculates the intensity of light or the number of photons incident on the light detector based on a dimension of a signal waveform of the detection signal threshold processed by the threshold value processing circuit unit.

2. The light quantity detection device according to claim 1, wherein the number-of-photons calculation circuit unit calculates the intensity of light or the number of photons incident on the light detector based on a ratio of the dimension of the signal waveform of the detection signal threshold processed by the threshold value processing circuit to a dimension of a reference signal waveform based on a dimension of a signal waveform of a part which is larger than the threshold value among waveforms of signals after A/D converting a detection signal when one photon is incident on the light detector by the A/D converter and A/D converted and threshold value-processed by the threshold value processing circuit.

3. The light quantity detection device according to claim 1, further comprising:
a threshold value setting unit which sets the threshold value for threshold value processing by the threshold value processing circuit unit which is input from the outside.

4. The light quantity detection device according to claim 1, further comprising:
a threshold value setting unit which sets the threshold value for threshold value-processing the A/D converted detection signal by the threshold value processing circuit based on an output signal from the light detector when light is not detected.

5. The light quantity detection device according to claim 1, wherein the detector is a photon counting light detector.

6. The light quantity detection device according to claim 1, wherein the amplifier is an amplification unit in which a gain is variable.

7. A light quantity detection method, comprising:
detecting light by a light detector;
amplifying a detection signal from the light detector detecting the light;
A/D converting the amplified detection signal;
threshold value-processing the A/D converted detection signal which is acquired by substituting a signal at a level which is equal to or less than a threshold value among the A/D converted detection signals into a preset reference value; and
calculating the intensity of light or the number of photons incident on the light detection means from the detection signal which is threshold value-processed,
wherein in the calculating of the number of photons, the intensity of light or the number of photons incident on the light detector is calculated based on a dimension of a signal waveform of the detection signal threshold processed.

8. The light quantity detection method according to claim 7, wherein the intensity of light or the number of photons incident on the light detector is calculated based on a ratio of the dimension of the signal waveform of the detection signal which is threshold processed to a dimension of a reference signal based on a dimension of a signal waveform of a part which is larger than the threshold value among waveforms of signals after a detection signal when one photon is incident on the light detector is amplified to be A/D converted, and A/D converted and threshold processed.

9. The light quantity detection method according to claim 7, wherein the threshold value is input from outside to be set.

10. The light quantity detection method according to claim 7, wherein the threshold value is set based on an output signal output when the light detector does not detect light.

11. The light quantity detection method according to claim 7, wherein the detector is a photon counting light detector and calculates the intensity of light or the number of photons incident on the photon counting light detector is calculated.

12. The light quantity detection method according to claim 7, wherein the detection signal from the light detection means is amplified by an amplifier in which a gain is variable.

* * * * *